(12) United States Patent
Chao

(10) Patent No.: US 6,360,325 B1
(45) Date of Patent: Mar. 19, 2002

(54) METHOD FOR RETARDING THE DUPLICATION OF A DATA-STORAGE DEVICE

(76) Inventor: Guo Chiang Chao, 5F, No. 10, Lane 22, Wan An St., Taipei (TW)

( * ) Notice: Subject to any disclaimer, the term of this patent is extended or adjusted under 35 U.S.C. 154(b) by 0 days.

(21) Appl. No.: 09/197,443

(22) Filed: Nov. 23, 1998

(51) Int. Cl.$^7$ ................................................ G06F 11/30
(52) U.S. Cl. .......................... 713/200; 713/187; 705/57
(58) Field of Search .................... 713/200, 187; 380/201, 202, 203; 705/57, 58

(56) References Cited

U.S. PATENT DOCUMENTS 6,081,897 A * 6/2000 Bersson ...................... 713/200
6,256,392 B1 * 7/2001 Sako et al. .................. 380/203
2001/0006578 A1 * 7/2001 Usui et al. .................... 386/94

* cited by examiner

Primary Examiner—Scott T. Baderman
(74) Attorney, Agent, or Firm—Rosenberg, Klein & Lee

(57) ABSTRACT

A method for retarding the duplication of data-storage device, by which the main program of the software in the data-storage device is hard to duplicate. The inventive method uses a processing program to access data in a base of specific prime number determined by the software developer. The original main program in software to be protected is encoded and then linked with the processing program to form a composite, which will initialize an examining procedure. Moreover, a plurality of checking codes are added into the composite program. The feature of data assessing in a base of specific prime number and the incorporation of checking codes can retard the attempt of copying.

2 Claims, 3 Drawing Sheets

METHOD FOR RETARDING THE DUPLICATION OF A DATA-STORAGE DEVICE

FIELD OF THE INVENTION

The present invention relates to a method for retarding the duplication of a data-storage device, more particularly, to a method for retarding the duplication of a main program in the data-storage device, thus protecting the intelligent property.

BACKGROUND OF THE INVENTION

Today is an information era, the application of computers influences every aspect of our life. As long as the computer software grow sophisticated, the capital and human resource required for the development of software are vast. Nevertheless, the profit is also tremendous if the software product is popular.

However, vast profit of selling computer software has always attracted many cormorants to duplicate (copy) those popular software and gain unlawful money. The action of duplicating and selling software is an unlawful way infringe the intelligent property and make costly damage to those who develop the infringed software. Therefore, how to prevent the storage device, such as hard disk, floppy disk, CDR . . . etc from being duplicated is important for protection of intelligent property.

In general, the computer-related data are stored in a data-storage, device such as hard disk, magnetic tape, MO, CDROM, CDR . . . etc. There exist various skill for preventing the duplication or copying of the contents in those data-storage device. Taking the floppy disk as an example, some skills, such as different format, multi-track, laser punching, data structure transformation, encoding . . . etc, are employed to block the infringer. Taking the CD-ROM as an example, some skills, such as bad track, gap, ultra large file, sub-channel music track . . . etc, are employed to block the infringer. Moreover, those approaches are easy to trace by experienced hackers and can not protect the data stored in the storage device virtually.

To get a better insight into the protection of software, the classification of file type is essential. The data files, such as music data (WAVE file or MP3 file), video file (DAT file of MPG file), or graphic file (GIF file, JPG file or BMP file), have stipulated specification for convenience of designing viewing/playing program. Therefore, this kind of data are difficult to manipulate for preventing duplication. Moreover, another kind of files are executable files such as the start up program or setup program of an application program hereinafter these files are generically referred to as main programs. These types of files generally can not be viewed by a viewing program, therefore, they are more likely conceived in a duplication-retarding scheme.

It is an object of the present invention to provide a method for retarding the duplication of the main program of software stored in a data-storage device.

To achieve the above object, the method according to the present invention comprises the following processing phases.

First phase is a preparation phase. In the preparations phase, a processing program is provided to globally or locally encode the main program to be protected, the processing program further employs a "specific prime number" as the base of data movement, other than conventional move operation with the base of 8 bit. The processing program also can add checking code into specific location of the main program for the checking operation in a later phase. The checking codes are also added by the above-mentioned prime-number base, the integrity of the checking codes will be lost if a conventional copy command (generally in the base of 8 bits) is used to copy the checking code.

Furthermore, a link program is provided to link the processing program and the main program to be protected into a composite program which is an execution file.

In the first phase, an examining program is provided as the new main program of the composite program. The examining program is functioned to determine the genuineness of the main program to be protected in the data storage device by checking the predetermined checking codes.

The second phase is the test and manufacture phase, the main program to be protected has been encoded and added with checking codes by the processing program and then linked with the processing program and the checking program to form a executable composite program by the link program. The composite program is tested, by the built-in checking program and the processing program whether all the checking codes thereof are right. The data-storage device containing the processed main program are mastered for a small quantity and added with checking code. The data-storage device can be mass-produced if the small amount of mastered pieces have passed the test of checking codes by the processing program and the checking program.

The final phase, the third phase, in the data-storage device is executing, the examining program is invoked to check the genuineness of the data-storage device. The examining program uses the processing program to check the predetermined checking codes. The program is terminated if any of the checking code is wrong and the original main program is decoded by the processing program if all the checking codes are right.

The various objects and advantages of the present invention will be more readily understood from the following detailed description when read in conjunction with the appended drawing, in which:

DETAIL DESCRIPTION OF PREFERRED EMBODIMENT

Figure 1A:
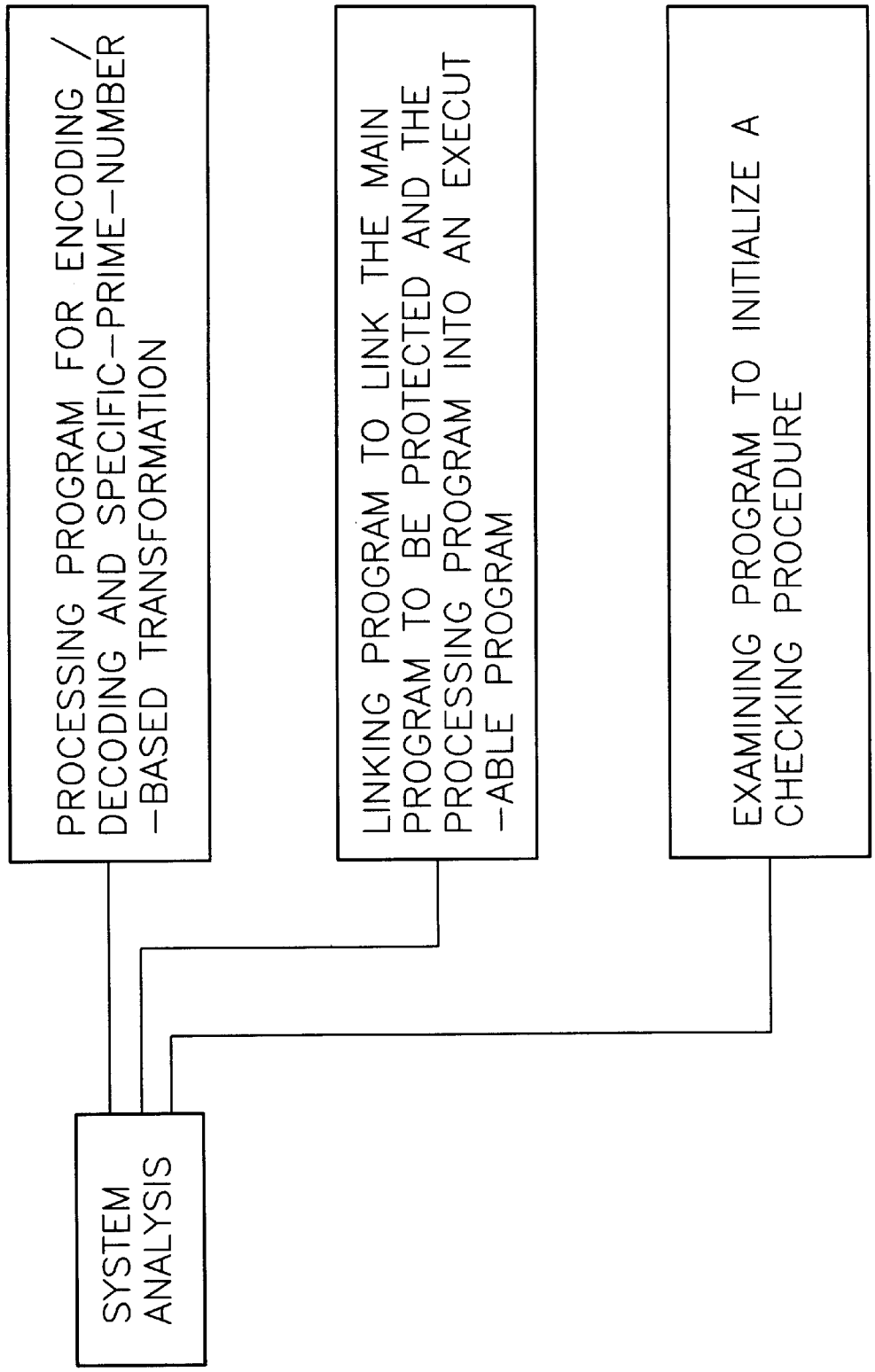
FIG. 1A is a flowchart illustrating a first stage of processing in the present invention.
Figure 1B:
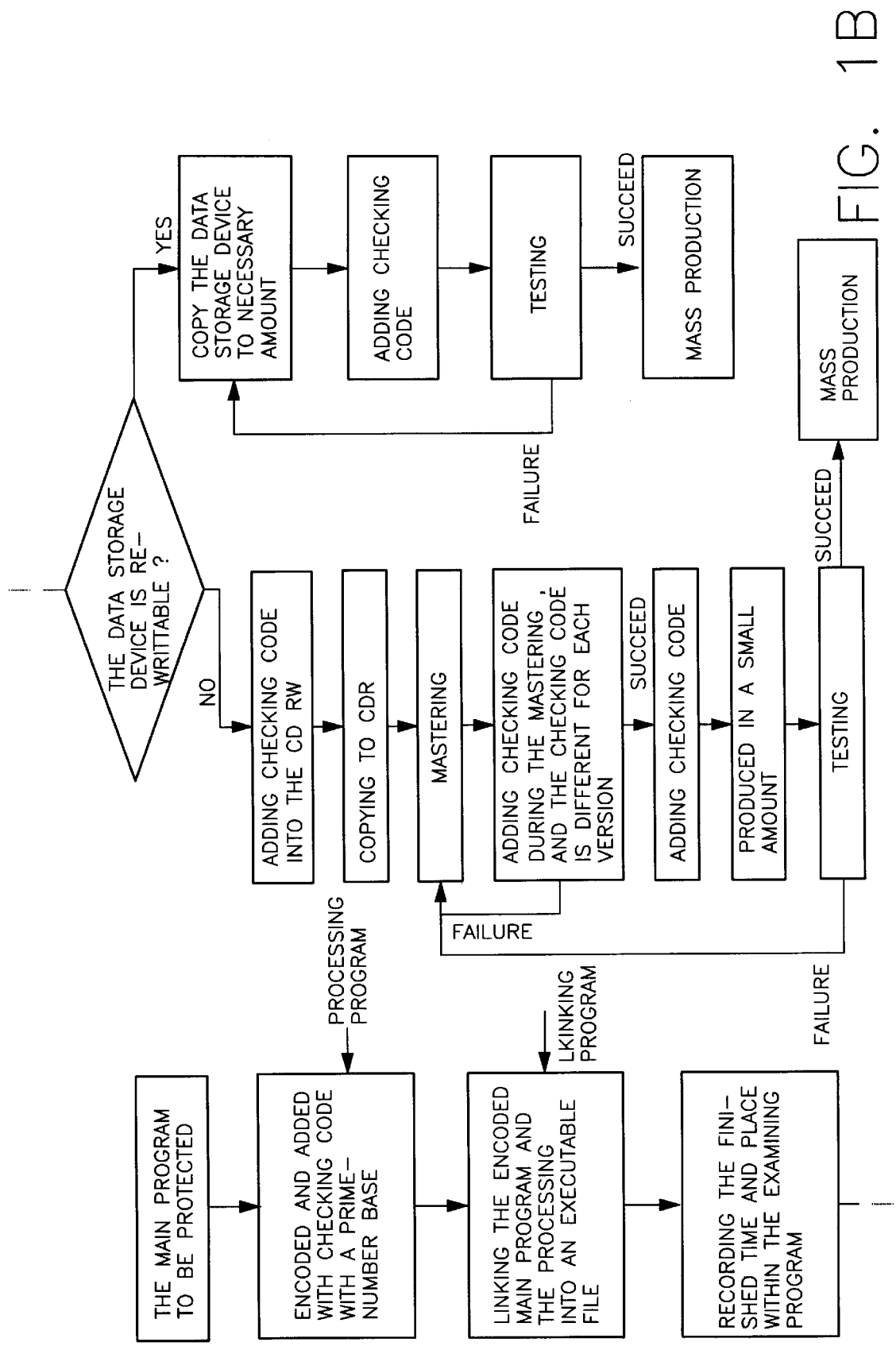
FIG. 1B is a flowchart illustrating a second stage of processing in the present invention; and, FIG. 1C is a flowchart illustrating a third stage of processing in the present invention.
Figure 1C:
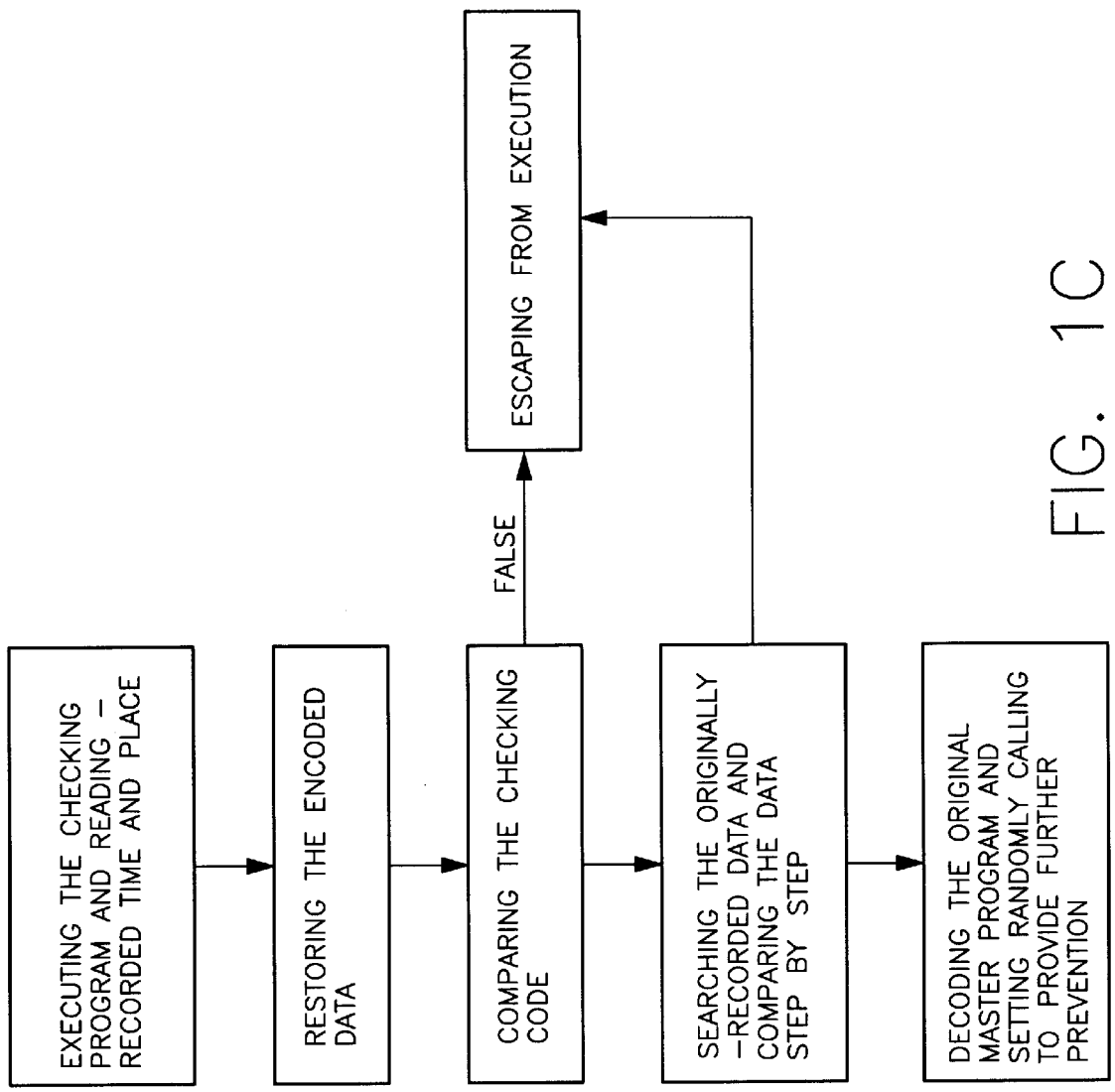

The present invention is intended to provide a method for retarding the duplication of the main program in the data-storage device. The method of the present invention comprises three phases. The first phase is a preparation phase and comprises three programs, a processing program, a link program and an examining program for manipulating the main program to be protected.

The processing program is functioned to locally or globally encode the main program, (file with the extension .com exe .bat) to be protected. Moreover, the processing provides a particular move operation which is executed with the unit of prime-number bit, different to the conventional move operation which is executed with the unit of 8 bits. Moreover, the processing program can add checking codes in specific locations of the main program to be protected in the unit of prime-number bits. The truth table of the checking result of those checking codes can be programmed by the software developer to block the intended hacker. In other words, the checking codes can be skillfully programmed to prevent the trace of hackers.

The link program is used to link the processed (encoded) main program, the processing program and the examining program explained later into an executable composite program. This new composite program replaces the original main program and becomes the only executable program in the data to be protected.

The examining program is used to record the time and the data of the processed data, which are useful in later examining procedure.

The second phase of the inventive method is test and manufacture phase. The main program to be protected, the processing program and the checking program are linked by the link program to form a composite program wherein the main program to be protected is encoded entirely or partially, the processing program is functioned for the prime-number-base transformation, and the examining recording the time when the composite program is finished. The composite program, together with the non-executable data in the software to be protected, form source data.

Afterward the source data is added with checking codes according to the types of data storage device used. If the data storage device is rewritable, for example, floppy disk, the source data is copied by a copying machine for little amount and each copied data is added with checking codes. The copied data are then checked with the examining program.

If the data storage device is write-once, for example, CD-ROM, the source data is first written into a CD-RW by a CD-recorder and the checking codes are added into the CD-RW to form a master CD. The master CD is then used to produced CD-ROM for little amount and the checking codes are added at the same time. The trial CD-ROM are tested by the examining program to check whether the original main program can be restored after the procedure of examining checking code with originally-defined parameters.

The master CD is used to mass produce CD-ROM if the original main program can be successfully restored. Otherwise, the examining program and the insert location of the checking codes should be modified until the examining procedure is all right.

The third phase is the examining and execution phase. When a computer user wants to execute the software protected by the inventive method, the examining program in the composite program initializes a checking procedure. The checking parameters (finished date, and place for the source data) are loaded to the main memory for checking reference. The examining program then checks each checking code with the processing program taking charge in the operation of prime-number-base transformation. Because the checking codes are stored and read in prime-number based operation, they are hard to be duplicated at exact position and value. The original main program is restored only when all checking codes have been verified successfully. Moreover, the examining program can initial random checking procedure during the use of the software protected by the inventive method, thus providing a more secure protection.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for inhibiting duplication of an application program provided on a storage medium, comprising the steps of:

providing at least one checking code;

providing a processing program to convert an original base of said at least one checking code to a predetermined prime number base and to translate said predetermined prime number base back to said original base;

appending said at least one checking code in said predetermined prime number base to a code of the application program, said at least one checking code being added at a predetermined location of the code of the application program;

providing an examining program for checking validity of said at least one checking code;

appending said processing program and said examining program to the application program to form a composite program, said composite program being executable to first check validity of said at least one checking code prior to execution of the application program, the execution being terminated if said at least one checking code is invalid;

storing said composite program on the storage medium, whereby subsequent copying of said composite program from the storage medium using a data transfer program for code in the original base improperly transfers said at least one checking code stored in said predetermined prime number base.

2. The method of claim 1 where the step of providing at least one checking code includes the step of providing a plurality of checking codes, each of said plurality of checking codes being converted to said predetermined prime number base and appended to respective different locations of the code of the application program.

* * * * *